US010255697B2

(12) United States Patent
Homann et al.

(10) Patent No.: US 10,255,697 B2
(45) Date of Patent: Apr. 9, 2019

(54) METHOD FOR GENERATION OF SYNTHETIC MAMMOGRAMS FROM TOMOSYNTHESIS DATA

(71) Applicant: KONINKLIJKE PHILIPS N.V., Eindhoven (NL)

(72) Inventors: Hanno Heyke Homann, Hannover (DE); Klaus Erhard, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/525,081

(22) PCT Filed: Nov. 10, 2015

(86) PCT No.: PCT/EP2015/076115
§ 371 (c)(1),
(2) Date: May 8, 2017

(87) PCT Pub. No.: WO2016/078958
PCT Pub. Date: May 26, 2016

(65) Prior Publication Data
US 2017/0316588 A1 Nov. 2, 2017

(30) Foreign Application Priority Data
Nov. 20, 2014 (EP) .................................. 14194069

(51) Int. Cl.
*G06T 11/00* (2006.01)
(52) U.S. Cl.
CPC ........ *G06T 11/008* (2013.01); *G06T 2210/41* (2013.01); *G06T 2211/408* (2013.01)

(58) Field of Classification Search
CPC ............. G06T 11/008; G06T 2211/408; G06T 2210/41
See application file for complete search history.

(56) References Cited

U.S. PATENT DOCUMENTS

| 7,474,727 B2 * | 1/2009 | Vives .................. G01N 23/046 378/4 |
| 7,760,924 B2 | 7/2010 | Ruth |
| 9,836,872 B2 * | 12/2017 | Erhard .................... G06T 15/08 |

(Continued)

FOREIGN PATENT DOCUMENTS

| WO | 9746971 | 12/1997 |
| WO | 2011044295 | 4/2011 |
| WO | 2013078476 | 5/2013 |
| WO | 2014/207080 | 12/2014 |

OTHER PUBLICATIONS

Gur, et al., "Dose Reduction in Digital Breast Tomosynthesis (DBT) Screening using Synthetically Reconstructed Projection Images", Academic Radiology, vol. 19, No. 2, Oct. 3, 2011.

(Continued)

*Primary Examiner* — Brenda C Bernardi
(74) *Attorney, Agent, or Firm* — Larry Liberchuk (57) ABSTRACT

A method and related apparatus (VS) for synthesizing a projection image (S), in particular for use in mammography. It is proposed to compute a weight function from one image volume (V1) and is then used to implement a weighted forward projection through another image volume block to compute a synthesized projection image (S) across block (V2).

14 Claims, 4 Drawing Sheets

(56) References Cited

U.S. PATENT DOCUMENTS

| | | | |
|---|---|---|---|
| 2004/0264626 A1* | 12/2004 | Besson | A61B 6/032 |
| | | | 378/4 |
| 2007/0183564 A1 | 8/2007 | Li | |
| 2008/0155468 A1 | 6/2008 | Rosander | |
| 2010/0135558 A1 | 6/2010 | Ruth | |
| 2014/0327702 A1 | 11/2014 | Kreeger | |
| 2014/0376691 A1* | 12/2014 | Hoernig | G06T 11/006 |
| | | | 378/37 |
| 2015/0052471 A1* | 2/2015 | Chen | A61B 6/025 |
| | | | 715/771 |
| 2015/0257722 A1* | 9/2015 | Wang | A61B 6/4241 |
| | | | 378/5 |
| 2016/0140749 A1* | 5/2016 | Erhard | G06T 15/205 |
| | | | 345/424 |
| 2016/0267651 A1* | 9/2016 | Maack | A61B 6/482 |

OTHER PUBLICATIONS

Guido, et al., "Generating Synthetic Mammograms from Reconstructed Tomosynthesis Volumes", IEEE Transactions on Medical Imaging, vol. 32, No. 12, Dec. 1, 2013.

Yee, et al., "FDA panel gives nod to 2D synthetic mode for Hologic breast tomo", 2012.

PRNewsWire, "Hologic Introduces Synthesized 2D Image Algorithm Designed to Eliminate the Need for a 2D Mammogram in a 2D plus 3D Tomosynthesis Exam" 2011.

Rautek, P. et al., "Semantic Layers for Illustrative Volume Rendering", IEEE Transactions on Visualization and Computer Graphics, vol. 13, No. 6, Nov./Dec. 2007.

\* cited by examiner

METHOD FOR GENERATION OF SYNTHETIC MAMMOGRAMS FROM TOMOSYNTHESIS DATA

CROSS REFERENCE TO RELATED APPLICATIONS

This application is the U.S. National Phase application under 35 U.S.C. § 371 of International Application No. PCT/EP2015/076115, filed Nov. 10, 2015, published as WO 2016/078958 on May 26, 2016, which claims the benefit of European Patent Application Number 14194069.2 filed Nov. 20, 2014. These applications are hereby incorporated by reference herein.

FIELD OF THE INVENTION

The invention relates to an image processing method, to an image processing apparatus, to a mammography imaging system, to a computer program element, and to a computer readable medium.

BACKGROUND OF THE INVENTION

In X-ray tomosynthesis, multiple X-ray projections (for instance, mammograms) from different angles are acquired and computationally combined into a 3D tomographic image volume.

Typically, at least one conventional 2D mammogram is also acquired as a reference image. However, this comes at the expense of yet another radiation dosage exposure.

Another option is to use a computational method to generate a "synthetic" mammogram view from the available 3D tomographic image volume.

A method to compute synthetic mammograms is based on the maximum-intensity-projection (MIP) approach and is described in U.S. Pat. No. 7,760,924.

SUMMARY OF THE INVENTION

There may be a need for an alternative method and related apparatus to compute a projection image.

The object of the present invention is solved by the subject matter of the independent claims where further embodiments are incorporated in the dependent claims. It should be noted that the following described aspect of the invention equally apply to the image processing apparatus, to the mammography image system, to the computer program element and to the computer readable medium.

According to a first aspect of the invention there is provided an image processing method for forming a projection image, comprising:

based on a first image, which is obtained from a first set of data acquired by a tomographic imaging system, computing a weight-function computed by computing any or a combination of the following measures: an information theoretic quantity, an edge measure quantity, an intensity measure quantity; based on at least a second image, which is obtained from a second set of data acquired by a tomographic imaging system, forward projecting across the second image, along a desired projection direction, to produce a projection image, wherein the first or the second image is a tomosynthesis volume and the projection image is a synthetic image, wherein the forward projection is weighted as per said weight function, and wherein the weight function is re-sampled to match the sampling of the second image by applying an interpolation scheme.

In other words, image structure is taken from the first "structure pool" image and the information gained is then used in the forward projection across the second image to for instance emphasize by the weighting this image structure in the second image. In other words, certain image structures might be better visible in the first image, in which the weight function is computed. For instance, dense tissue structures (such as carcinoma) have been found to better visible in a glandular part of a spectral decomposition into adipose and glandular tissue components. Applying the weight function (learned from the first image) to the second image will enhance these image structures, which may not otherwise be discernible in the second image. Because the volumes of the first and second images may be different the weight function based on the first image is re-sampled to match the sampling of the second image by applying an interpolation scheme. In case the volumes are the same the resampling may be just an identity function.

The weight computation will need to be done only once for the first image and can then be used for forward projections in the other, second image or indeed in each of a plurality of other images. This affords an efficient computational implementation.

The weight function is computed by computing any or a combination of the following measures: an information theoretic quantity (such as entropy, particular Shannon's measure), an edge measure quantity, an intensity measure quantity and other suitable measures. It may be envisaged to combine two or more measures to form a combo-measure and to consolidate the measures by weighting and normalizing into a single measure to capture different structures.

According to one embodiment of the image processing method the first image and the second image are derived from at least two different energy channels of a spectral tomographic imaging system with an energy-resolving photon-counting detector unit, and the predefined projection geometry is chosen similar to a 2D mammographic projection geometry.

According to one embodiment, the computing of the weight function comprises local filtering and or smoothing.

According to one embodiment, the first image is any one of: a spectral image reconstructed from data detected by a photon-counting detector, a reconstructed spatial frequency component image derived from a multi-scale decomposition.

According to one embodiment, the second image is a reconstructed energy weighted image volume.

According to one embodiment, the weight function is one from a plurality of resolution level specific weight functions, each computed for different resolution levels of the first image.

According to one embodiment, the second image is derived from a multi-scale decomposition, wherein a resolution level of the second image corresponds to a resolution level of the resolution specific weight function.

According to one embodiment, the weight function is computed by using a sequence of kernels with different sizes.

According to one embodiment, the measure, on which the computation of the different weight functions is based, varies with the resolution level.

According to one embodiment, the first or the second image is a tomosynthesis volume and the projection image is a synthetic mammogram.

According to one embodiment, the images are dynamic 4D volumes and wherein the projection image corresponds to a dynamic 2D projection view.

According to one embodiment the image elements are individual voxels or are elements of a coarser partition of the volume. In one embodiment, the size of the image elements can be adjusted thereby providing a means to strike a useful balance between resolution requirements and computation time and/or memory constraints.

A main application of the proposed method (but by no way restricted thereto) is screening and diagnosis in X-ray mammography. With the present approach, the conventional 2D mammogram (that is, an actual image acquisition (non-synthesized) in addition to the previously acquired tomosynthesis volume block) may be omitted and the synthesized image may replace conventional 2D mammograms. Any kind of tomosynthesis application such as lung/chest tomosynthesis, orthopedics tomosynthesis will benefit from this method. The method can also be applied to other imaging modalities which provide 3D volumes for instance, breast CT, chest CT, chest MR, and others.

The projection used by the forward-projector may be a parallel or a central projection or other.

BRIEF DESCRIPTION OF THE DRAWINGS

Exemplary embodiments of the invention will now be described with reference to the following drawings wherein.

DETAILED DESCRIPTION OF EMBODIMENTS

Figures 1, 1A:
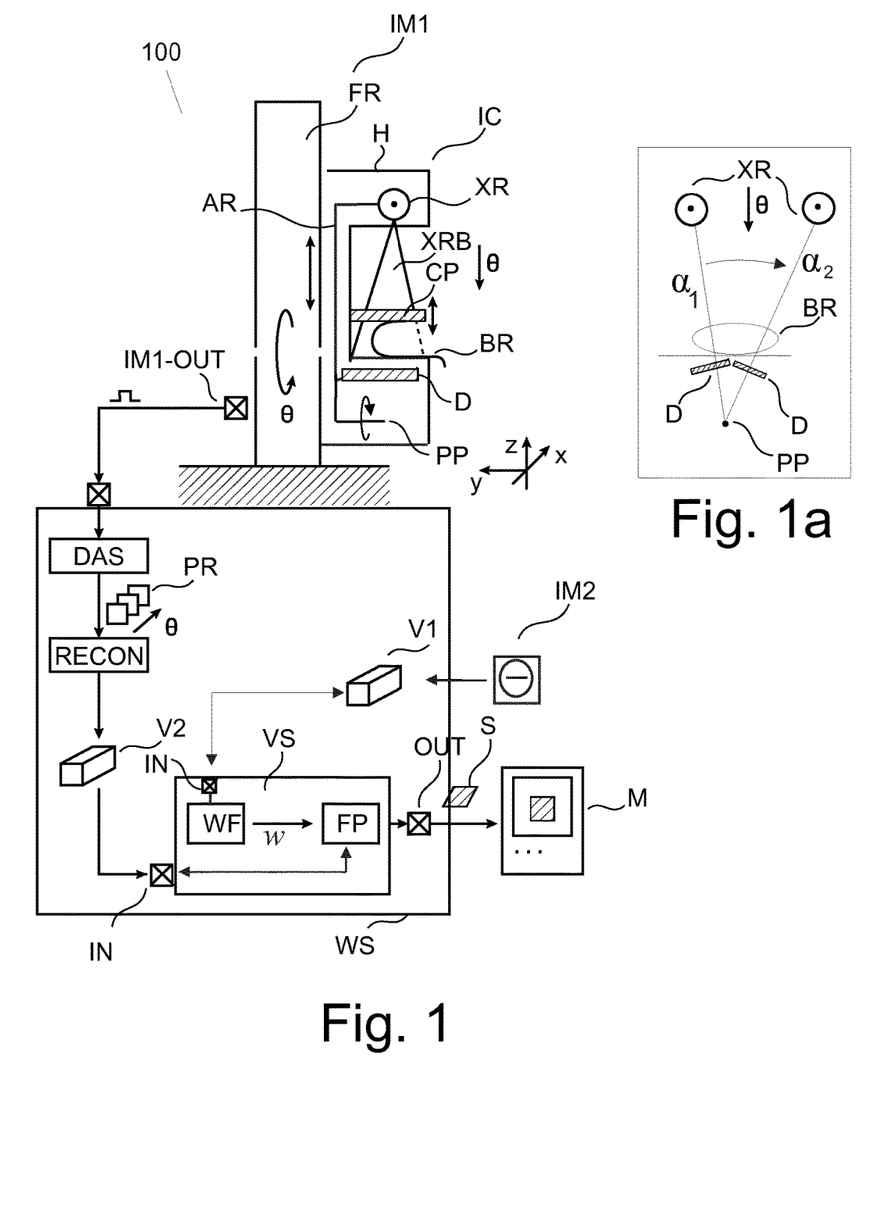
FIG. 1 shows a block diagram of an imaging arrangement including a view synthesizer.

With reference to FIG. 1, there is shown an imaging arrangement 100. The arrangement 100 comprises in one embodiment an imaging modality IM1 such as a (3D) tomosynthesis mammography imaging scanner (MIS) (also referred to herein more generally as the "imager") and a workstation WS for controlling operation of MIS. Although the imaging modality IM1 is explained in some detail below, other (types) of imaging modalities are also envisaged instead, such as CT (computed tomography) scanner, MRT etc.

The MIS includes a frame FR which is either wall mounted or freestanding. On said frame FR, a rigid imager carriage IC is mounted so as to be slidable along a vertical axis y. The imager carriage is energizable by a suitable actuator-controller arrangement for precise positioning along said axis to so accommodate the imaging system to height requirements of a patient whose breast BR is to be imaged.

The imager carriage IC includes a movable arm (or "gantry") AR on one, upper end of which is mounted an X-ray source XR and towards the other, lower end an X-ray radiation sensitive detector D. The other, lower end of arm AR terminates in a pivot point PP. Thus, when the arm AR swings about said pivot point PP, the detector D and the X-ray source XR together trace out respective arc segments around said pivot point PP. This is shown in inset FIG. 1a, which affords a schematic front view along y-axis on the MIS. In one embodiment, the arm AR further includes a (pre-) collimator arranged between detector D and X-ray source XR. The carriage IC is housed in a housing H having a cut-out which defines an examination region between X-ray source XR and detector D. The arm AR is so arranged in the carriage IC, that detector D is located opposite the radiation source XR, across the examination region to receive the radiation beam XBR after its passage through a region of interest ROI. In the examination region, there is slidably (along vertical z-axis) arranged a compression plate CP that can be shuttled between X-ray source XR and detector D either manually or by energizing same via a suitable actuator-controller arrangement.

The imaging system MIS is connected via suitable interfaces means MIS-OUT and across a communication network to workstation WS. In general, workstation is a computing system with which a clinician ("user") is able to control operation of the imaging system. According to one embodiment, there is also a display unit or monitor M which is controlled by work station WS and which allows displaying of images that are acquired by the imaging system. Workstation WS runs an operating system which in turn controls execution of a number of modules whose operation will be explained in more detail below.

In use, the carriage IC receives a control signal from work station WS and is thereby instructed to tilt into a desired main imaging position θ (in FIG. 1a, θ is at a 12 o'clock, caudal cranial (CC) approach angle) relative to the examination region and the carriage moves into a height appropriate z-position.

Patient is then asked to introduce the relevant breast BR into the examination region. Compression plate CP then slides downwardly and into contact with breast BR to gently compress breast BR against a breast support (not sown in FIG. 1) arranged between plate CP and detector D to ensure image quality. Compression plate CP and breast support are so arranged in the carriage IC that the arm AR can swing about its lower pivot point. The X-ray source XR orbits around the breast BR and the detector D traces out a scan arc underneath the breast BR whilst both, plate CP and breast support (and hence breast BR), remain stationary.

Whilst the detector traces out the scan arc segment, the X-ray source XR is energized to emit an X-ray beam XRB that passes through the breast tissue. In one embodiment (but not necessarily in all embodiments), the imager MIS is configured as an X-ray absorption imager and the quantity of interest are the different levels of attenuation experienced by said X-ray beam XRB in its passage through the breast tissue. Attenuation levels are a function of the density distribution in the breast tissue.

It is the so attenuated X-ray beam XRB that is then incident on the detector D's image plane and the attenuated X-rays are detected by the detector D from different projection directions $\alpha_i$ centered around the main projection direction as the detector traces out its scan arc. Detector D's image plane is made up of a number of individual detector pixels. Each pixel acts to transduce radiation energy of an impinging ray of radiation beam PRX into electrical or optical signal. Specifically, and according to one embodiment, the detector D is of the energy integrating type. In an alternative, preferred embodiment, MIS has spectral imaging capabilities and the detector D is of the photon counting type. In one embodiment, the detector pixels are arranged in discrete, spaced apart "lines" (that extend in FIG. 1a into the paper plane, y-direction). In one embodiment, the collimator's openings (slits) are in register with the spacing of the detector lines.

Whilst the detector D traces out scan arc underneath the breast BR in the manner described above, a set of projection data from different projection directions $\alpha_i$ (only two $\alpha_{1,2}$ are shown in FIG. 1a's frontal view) is obtained. As such, the outlined imaging procedure is very similar to CT (indeed, in one embodiment the imager may very well be a CT or other imagers, as the MIS shown in FIG. 1 is but one exemplary embodiment), but in a mammography the projection directions are not across a full or semi-circle but are limited to a relatively small arc segment. Typically, there are only two main directions or approach angles: $\theta_{CC}$ for CC view mentioned above and $\theta_{MLO}$ for MLO (mediolateral-oblique), at 12 o'clock and approximately 2 o'clock, respectively when looking at the MIS in a frontal view along y axis as per FIG. 1a, with respective arc segments $\theta_{CC}-\Delta\alpha \leq \alpha_i \leq \theta_{CC}+\Delta\alpha$ and $\theta_{MLO}-\Delta\alpha \leq \alpha_i \leq \theta_{MLO}+\Delta\alpha$ centered around each of the two main views.

Projection "raw" data as detected by the detector D (no matter its type) pixels is processed by a DAS (data acquisition system) to form different digitalized projection images PR of the ROI, one for each projection direction $\alpha_i$. Specifically, the collection of said raw data signals are translated by DAS into a respective digital (pixel) values representative the quantity of interest, for instance in absorption imaging this is the accumulative density along the respective rays across the breast BR in the instant projection direction $\alpha$.

The above scan imaging procedure can be repeated after the whole imager carriage is tilted to change over from one main direction CC or MLO (approach angle) to the other if desired.

The plurality of projection images PR are then passed on to a tomosynthesis reconstructor RECON. The tomosynthesis reconstructor RECON is configured to reconstruct from the projection images PR a 3D image volume (block) V2 that can be thought of being made up of voxel (x,y,z) organized in image slices SL with in-plane coordinates (x,y) for each of different slice z. Each slice after suitable rendering can visualize a cross-sectional view on the internals of the breast BR so that diagnostically relevant structures such as micro-calcifications or tissue abnormalities can be identified. Reconstruction algorithms for tomosynthesis are known from the literature. They are tuned to cope with the limited number of projection images and limited tomographic angle available (as compared to CT imaging). Iterative reconstruction techniques may be used or others as has been reported elsewhere.

On occasion the user may be desirous to have a projection view or image ("mammogram") of the complete breast BR similar to a conventional 2D mammogram which summarizes or consolidates the image information of the V2 tomosynthesis block into a single 2D image to help the user navigating the V2 volume which is more difficult and time-consuming than in a lower, 2D space. In other words, a 2D projection image can serve as an "overview" image on the T tomosynthesis block that may include highly involved structures. Note that the 2D raw projection views are usually not suited for this purpose as they are usually acquired with much lower X-ray dose than a conventional 2D mammogram and hence exhibit significantly higher noise than a conventional 2D mammogram or the reconstructed 3D volume.

To address this need, the arrangement as proposed herein includes a view synthesizer VS that allows to computationally synthesize the desired 2D projection view S from the available tomosynthesis block V2 along a desired (virtual) projection direction as from a virtual x-ray source VXR. There is therefore no need to operate the imager MIS to actually acquire a further 2D mammogram. A consequential, further radiation exposure of the patient can be avoided.

The view synthesizer VS as proposed herein uses a weighted forward projection algorithm. The weight function is computed from another image block V1. The image block V1 (that also includes image information of the object BR) is acquired by the same or a different imaging modality IM2.

The view synthesizer VS includes an input port IN, a weight function finder WF, a forward projector FP and an output port OUT. Briefly, the view synthesizer VS receives block V2 (or a storage/memory reference thereto) and a desired view or projection direction. Weight function finder WF and forward projector FP then operate on said blocks V1,V2, in a manner to be described in more detail below, to produce the desired synthetic mammogram S which is then output at output port OUT. Synthetic mammogram S can then be rendered for display on monitor M. The operation of the proposed view synthesizer VS may thus be understood to proceed in two-stages. In a structure exploration or evaluation phase, the weight function is computed from the first volume block V1 using a suitable structure measure, such as an information theoretic measure or edge measure or other measures. Different such measures may also be combined into a combination measure (by forming a common score, such an average or a weighted average from different measures) or different measures may be used for different parts of the volume or for different frequency components of the image, etc. In the second, "projection synthesizer" phase, the weight function so computed is then used by the forward projector FP to compute the synthetic mammogram S.

The first image block V1 may include different image information from that in block V2. For instance, the image information from the two blocks V1,V2 may stem from different imaging channels (of the same modality IM1 or the other modality IM2) such as different energy channels in spectral imaging or the different image channels of absorption, phase shift or dark field signal in interferometric phase contrast imaging. Also, one image V1,V2 may relate to a primary image signal whereas the other image is a "secondary" image that is derived from the primary signal by computation, for instance, as in material decomposition imaging based on spectral image data: there, the image data from two (or more) energy channels is processed to produce two (or more) images, one for each material in which one wishes to decompose into. Decomposition into adipose and glandular imagery is a non-limiting example from the field of mammography. In general the two image blocks V1,V2 encode different image information/quantities of interest of the same object BR based on different physical or imaging principles. Higher contrast or structural information in one block V1 can be used to boost contrast of structures in the forward projection across the other block V2 where such structural contrast may not have been readily discernible. In this sense, the proposed 2-phase visualizer VS allows using structure information "cross-block" to better harness and consolidate the total image information from a plurality of image volumes acquired from different channels/modalities.

Figure 2:
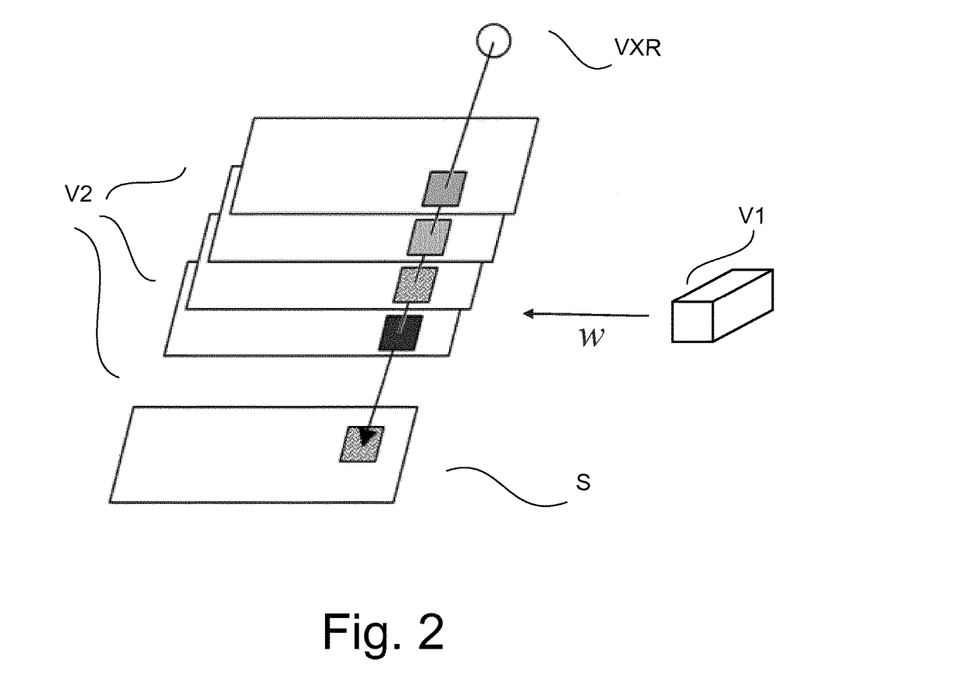
FIG. 2 shows operation of the view synthesizer of FIG. 1 on a 3D image volume.

Reference is now made to FIG. 2, which shows in the left part a simplified representation of the 3D volume V2. Only 4 slices of block V2 are shown for explanatory purposes with the understanding that the 3D volume V2 is usually made up of several tens of such slices.

First, the weight function w is computed from source block V1 based on an information theoretic measure according to one preferred embodiment although other measures are also envisaged herein. In V1, the information content (eg, Shannon entropy can be used to measure information) is locally mapped per image element (voxel or local neighborhood) for each slice of volume V1 and converted into a weight for the respective element position. Weight conversion may include suitable normalization. In some embodiments, a higher measure (in this case, the Shannon measure) at a given image element will attract a higher weight for said element.

Choosing sufficiently small neighborhood regions (e.g., as a non-limiting example, 2×2 mm² — not shown in FIG. 2) in V1 when defining the weight function w, ensures that smaller features are considered as well as the edges of larger tissue structures. The method as proposed herein can be efficiently implemented by pre-computing the information measure in V1 (an hence the weight function w) and applying an interpolation scheme. More precisely, the weight function is first computed on a coarse grid of V1 by computing the Shannon entropy measure in overlapping regions of 2×2 mm² in each x-y plane. To match the sampling of the image block V2, the weight function is first interpolated on a grid with the sampling of image block V2 and then normalized along the z-coordinate. In this way, a normalized and resampled weight function is obtained. Turning now to the left part of FIG. 2, the synthetic mammogram S is generated by forward projection through the tomosynthesis volume V2 using a number of virtual x-rays (only one is shown in FIG. 2), each describing the path from a virtual x-ray projection source VXR to one pixel of the synthetic projection image. Each virtual projection ray intersects with all slices of volume V2. Prior to computing the forward projection along this particular ray, each intersection point is multiplied with the corresponding value of the normalized and re-sampled weight function.

In one particular embodiment, the weight function is defined as the maximum entropy value along and hence only the pixel in the slice (third slice from top in FIG. 2) with highest information content weight (in the respective neighborhoods) is selected and used in the computation of the synthetic mammogram per projection ray.

This approach ensures that all relevant information from the 3D tomosynthesis volume V1 is propagated into the 2D synthetic view S of block V2 for reliable and efficient reading workflow, for instance when the view S across V2 is for presentation purposes on a viewing device such as monitor MT.

In the example of FIG. 2, synthetic mammogram S is computed for projection direction which happens to be parallel to the z-axis, that is along either one of the two main directions CC, MLO. When projecting along the z-axis, the computations involved turn out particularly simple because no interpolation is required as would be the case for other directions not parallel to the main image acquisition (z-)axis. Other projection directions are also envisaged and are user adjustable in one embodiment, for example in contexts where the volume has no preferred direction, such as isotropic magnetic-resonance images (MRI).

The synthetic mammogram S is computed in accord with the proposed method from a 3D weighted average of the reconstructed 3D volume V2 by applying a weighted projection to the 3D weighted volume V2 wherein the weight function is computed by weight finder WF from a different block V1. This can be formally summarized in the following equation:

$$\frac{FP(w(r) \cdot T(r))}{FP(w(r))} \quad (1)$$

with i) the 3D-Voxel position r in volume V2, ii) the spatially adaptive 3D weight function w(r), which ensures that structures of interest remain sharp and are not blurred when forward-projected with the forward projection operator FP(.). The weighting w as proposed herein is 3D or "fully spatially" adapted in the sense that the weight function not merely attaches weights per slice (or, in general, per hyperplane) but the weights are assigned across substantially all dimensions (in particular to in-plane voxels making up each of the slices themselves) of the 3D block through which the forward-projector is to project across.

In one embodiment, there is also a normalization (that is multiplication by 1/FP(w(r)) that ensures that the relative relationship between the voxel values on each projection line is preserved. The normalization respects, that is, preserves, the relative magnitudes along each projection line. Normalization may be taken separately for each projection line and the normalized weights add up to unity along each projection line.

Operation

Figure 3:
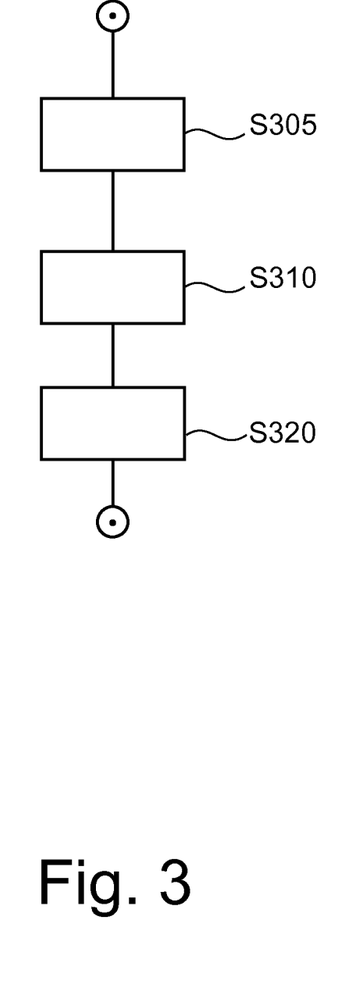
FIG. 3 shows a flow chart of an image processing method.

Operation of view synthesizer VS will now be explained in more detail with reference to flowchart of FIG. 3.

At step S305 a weight function w for use in a weighted forward-projection is computed by weight function finder WF introduced above. The weight function is computed from a first 3D image volume V1. This is done in one embodiment by using a suitable image structure measure e. In one embodiment the information content (for example with an entropy measure, such as Shannon entropy) is computed in local neighborhoods of each voxel. In one embodiment this is implemented as follows: Let e(r) be a suitable image structure measure, defined for every voxel position r or neighborhood U(r) within the 3D tomosynthesis volume V1. Envisaged image structures include, other than the Shannon entropy (or other information theoretic measures) an edge measure based on the Sobel operator or a Canny edge detector or similar filter. The response of structure measure e is in general "proportional" to (or at least varies directly with) the information content one wishes to quantify in the volume V1. Let then w(r)=f[e(r)] be the local weights, where f[.] is a function for "shaping" the weights, in other words, the actual measure e responses are mapped onto a suitable scale so they can be used as weights in the desired form. For instance, one may wish to have only positive numbers as weights or the weights are to lie in the unit interval, or a large response is to attract a small or large weight, and so on. According to one embodiment, weight shaper f is the identity function so the filter responses themselves are used as weights but whether or not this is possible depends on the numerical range of the weight finder WF.

In one embodiment, the source volume is a (tomosynthesis) volume reconstructed from projection data as explained above in Fig for illustrative purposes. In a preferred embodiment the projection data is acquired on a spectral tomosynthesis system with an energy-resolving photon-counting detector unit. Preferably a relatively low dose (lower than in conventional mammography) is used when acquiring the projection data. More particularly, in one embodiment, the source volume V1 is obtained by material decomposition based on the spectral photon-counting projection data. In particular, the image may be a glandularity image as known from spectral mammography.

At step S310, given a (user or protocol adjustable) desired forward projection direction for the synthesized projection, the projection image S (such as a synthetic mammogram) is computed by applying the weight function to another image volume V2 (different from structure pool image volume V1) and computing a weighted forward projection through the reconstruction volume V2.

In one embodiment, volume V2 is another reconstructed tomosynthesis volume. In one embodiment, the other reconstructed volume V2 is a reconstructed volume computed from energy-weighted spectral projection data. In one embodiment, V1 and V2 are, respectively, different linear combinations of the high and low energy images obtained in photon counting imaging or dual-energy imaging.

Also, it will be appreciated from the above that the actual computation of the structural measure is computed only for the source block V1 in step S305 to derive the weights. The structure measure computation is no longer required for V2 once the weights are gotten via V1. In V2, only the weights are used to compute the forward projection. This is allows an efficient computational implementation.

In the weighted forward projection of step S310 (as implemented by forward projector FP), the weight of each volume voxel (as recorded by weight function w from source block V1) then determines in one embodiment the relative "contribution" of said volume voxel value in the computation of the value of the projection point FP1. The synthetic mammogram S can then be computed as the weighted projection according to Equation (1) above. According to one embodiment, when used for mammography, the forward projection will operate along either one of the two main image acquisition directions CC, MLO. In other words, the forward projection will operate orthogonally through the tomosynthesis slices to avoid interpolation. It is then reasonable to use a geometry-matched grid or coordinate system for the previous volume reconstruction such that the tomosynthesis-artifacts are aligned with the grid. This amounts to effectively re-scaling each of the slices such that the magnification effect of the X-ray cone beam is compensated.

In such a case, equation (1) can be written as $$S(x,y) = \Sigma_{z=0}^{N} w'(x,y,z) \cdot V2(x,y,z) \qquad (2)$$

where x and y are the in-plane coordinates per slice SL, z is the through-plane coordinate (usually in the direction of the X-rays) and N indicates the number of reconstructed slices in the tomosynthesis volume. Furthermore, w' denotes the normalized spatially adaptive weight function w'(x,y,z) =f[e(x,y,z)], where f is some weight shaper and e indicates the function that returns the underlying measure such as the Shannon entropy or a Sobel or Canny Operator based edge measure. The weights are normalized such that the mean attenuation value (as encoded in the voxel values) is retained along the through-plane coordinate z. One method to transform into said geometry matched grid is described in U.S. Pat. No. 7,702,142.

In other embodiments, the weight function assigns weight "1" to the image element in the slice with the highest measure (eg highest Shannon measure) along the respective projection direction whereas all image element along the ray in the remaining slices attract a zero weight. In other words, the weight function is a binary indictor function and at is only the image element with the highest measure that contributes to the target projection point in the projection image S.

In step S320 synthesized projection image S is output via output port OUT. The projection image S may then be rendered for view on display unit M or stored in a database or otherwise image-processed.

Referring back to the spectral imaging embodiment mentioned above, the energy resolved (spectral) tomosynthesis projection data is acquired by separating the impinging photons with the energy-resolving detector into a high and a low energy bin. In this way, the spectral tomosynthesis projection data can be subsequently used for material decomposition and computation of tissue-specific images to reconstruct the structure pool image V1 in one embodiment. For instance, V1 may be reconstructed into an adipose and/or a glandular image as obtainable from a material decomposition based on spectral image data and a model for the material composition of the image object BR (breast being merely one example). In another embodiment, V1 may be reconstructed into a breast density ("glandularity") image and/or a "breast thickness" image with a tomosynthesis reconstruction algorithm from the family of algebraic reconstruction techniques (ART). Furthermore in one embodiment, the spectral projection data may be processed by energy-weighting from which a tomosynthesis volume data set V2 is reconstructed in one embodiment which is useful for presentation on a viewing device. It should be understood that the example from mammography for the application of the present method to spectral image data (and image derived from such data) is merely one example and the applications to other material decompositions and/or organs BR or objects BR to be imaged are likewise envisaged herein.

In a preferred embodiment, the entropy based weight function is computed only from the breast density image V1, and this weight function is then applied in the weighted forward projection across the tomosynthesis reconstruction volume V2 from the energy-weighted projection data.

The weight function is defined in this embodiment by a normalized Shannon entropy measure, which is computed at each voxel in the breast density image V1 in a local neighbourhood, defined by a rectangular window. Normalization ensures that the summation of the weights along each ray in the forward-projection add up to unity. Prior to normalization, the weight function may be locally filtered and/or thresholded. For example, the weight function might be subdivided into subregions first. Then, on each of the subregions, all voxels below a certain threshold are set to zero, and voxels above the threshold are assigned a weight of one. By subsequent smoothing of this function, for example with a Gaussian filter kernel, and normalization in each subregion, the weight function is derived in this embodiment. This normalized Shannon entropy based measure is also envisaged for use for volumes V1,V2 other than the breast density image or tomosynthesis reconstruction volume from the energy-weighted projection data.

In one embodiment, the computation of the weight function in step 305 is achieved with a multi-resolution approach. This multi-resolution approach can be combined with all embodiments described herein.

The multi-resolution approach can be realized in one embodiment, by computing the Shannon entropy measure as described earlier, but instead of using a fixed widow/kernel size, the Shannon entropy measure is now computed in a cascade of rectangular windows/kernels with increasing size. One then obtains a family of different weight functions, one of for each resolution level as defined by the window/kernel size.

This set of different weighting functions is then combined by adding and normalizing these weight functions into one final weighting function, which is then applied to the image V2.

In another embodiment one uses a multi-resolution decomposition of the image V1 and the image V2 based on known methods in the art, such as the Gauss-Laplace pyramid decomposition or wavelet analysis. The image is in general decomposed into a high pass, and various low pass and bandpass components. Weight functions are computed at each level of the decomposition for V1 and are then applied to the corresponding level of decomposition of the tomosynthesis volume V2.

In one embodiment, the measure used to compute the weight function at the different scales of the multi-resolution decomposition is dependent on said scale/level. For example, in one embodiment, the Shannon entropy-based weight function as discussed above is computed for low frequency image components below a certain threshold frequency, whereas different measure such the maximum-brightness measure is used on the high frequency part of the image.

As a further refinement, in one embodiment, the low spatial frequencies from a standard averaging projection are merged with the low frequency content of the entropy-weighted synthetic mammogram S to obtain the typical background appearance of a conventional 2D mammogram.

As mentioned above the Shannon entropy measure is but one example to define the weight function. Other embodiments for measures for weight definition are edge measures (implemented by the Canny or Sobel operator).

In yet other embodiments, the weigh finder WF includes a CAD (computer aided design) image feature detector. In CAD, operation is based on a library of features or templates such as different shapes of different sizes for different types of lesions, degrees of calcifications or, in other than mammography contexts, on shape footprints of certain organs of interest such as vessels or brain structures, etc. The CAD detector scans the volume T and detects those voxels that match said shape templates. The matched voxels may constitute suspicious shapes that are indicative to lesions spiculated masses etc. Measured against a user definable level of confidence, it is then decided whether or not a given voxel does form part of such a suspicious shape structure. Depending on the level of confidence of a given voxel, the weight is assigned accordingly: a high confidence will attract a higher weight whereas a low confidence a correspondingly lower weight.

Some of the weight function finder embodiments (such as the Sobel operator or the CAD detector) operate on voxel neighborhoods. According to one embodiment, the neighborhood sizes (for instance measured in voxel units across) are adjustable by user interaction. For instance in one embodiment, a graphical user interface is envisaged that allows the user to adjust neighborhood size on which filter module FL is to operate. Text based input means are likewise envisaged in some embodiments. Adjusting the voxel neighborhood, size adds a degree of flexibility when interfacing with different filter modules each requiring different neighborhood sizes. In this embodiment, at step S305, a specification of a size of at least one of the neighborhoods is received and the neighborhood is re-sized accordingly.

A combination with CAD-based techniques may be useful in the multi-resolution embodiments discussed above. Very small structures comprising only a few pixels (e.g. microcalcification) may contribute too little to the entropy of the local neighborhood and may get lost in the maximum entropy projection. Therefore, CAD based calcification detection, operating on high spatial frequencies only, can be applied to recover such structures. In general however, the method as proposed herein has been found to work well without resort to CAD detection.

Although in a preferred embodiment, weight function finder WF acts to assign information content weight substantially to all voxels in the volume V1, there are embodiments envisaged where this is not the case. For instance in one embodiment the user can specify a sub-volume along which the forward projection is to be taken. This volume restriction would allow saving CPU time. In this embodiment, it is envisaged that the user specifies for, instance by touch screen or pointer tool action in a graphical user interface on which the 3D volume T is displayed, a "projection window" (or field of view FoV), or a subset of slices for projection purposes. This is indicated in FIG. 2 by the dashed circle but the projection window FoV may take any desired shape such as a square or rectangular. The projection lines are then cast only across the so specified sub volume.

According to yet another embodiment in order to save CPU time, the view synthesizer VS affords to the user a functionality of "coarsening" the 3-D volume by using an under-sampling algorithm: adjacent voxels are collapsed into new, coarser image elements into which volumes V1,V2 is are partitioned. In other words, the 3-D volume is shrunk down in size so that the summation in equation (2) will extend across fewer terms and fewer weights will need to be computed.

In one embodiment the computation of the gradient at each voxel includes a temporal gradient component as well. This is of particular relevance when a projection image is to be synthesized for a dynamic 3-D volume, that is, for a times series of 3D volumes, also referred to as a 4D image volume. Because of the temporal gradient, image portions that vary strongly with time across the different 3D volumes will attract a high weight. In this embodiment, the synthesized projection image corresponds to a dynamic 2D projection view that allows the user to view the evolution, that is, changes over time of structures across the 3D volumes in a projection view along the desired projection direction.

For instance, in cardiac imaging, a circular tomosynthesis over a closed circular path is used. In a "sliding window" technique a time series of reconstructed volumes $V2_t$ are reconstructed which can then be forward-projected to produce a corresponding series of 2D views S. This can be used to simulate a fluoroscopy in catheter laboratory applications. Again, in this embodiment, the V1,V2 image volume pairs may be given by the high and low energy images obtained in spectral circular tomosynthesis.

In one embodiment, the first modality IM1 (eg, the MIS) may include interferometric gratings for phase contrast imaging and V2 may include the image information for the phase contrast or absorption signal whereas the source volume V1 is formed from the dark field signal.

In some embodiments, there may be a plurality of weights function computed from different image blocks $V1_i$ and the user can then choose in a user interaction which weight function (form which image block $V1_i$) is to be used in the forward projection depending on which structures are to be emphasized in the synthesized projection image S.

The components of view synthesizer VS, that is, weigh function finder WF and forward projector FP, may be programmed in a suitable scientific computing platform such as Matlab® and then translated into C++ or C routines maintained in a library and linked when called on by work station WS. Matlab for instance, features an "image processing toolbox" with a SOBEL operator module. The components may be arranged as dedicated FPGAs or as hardwired standalone chips.

Figure 4:
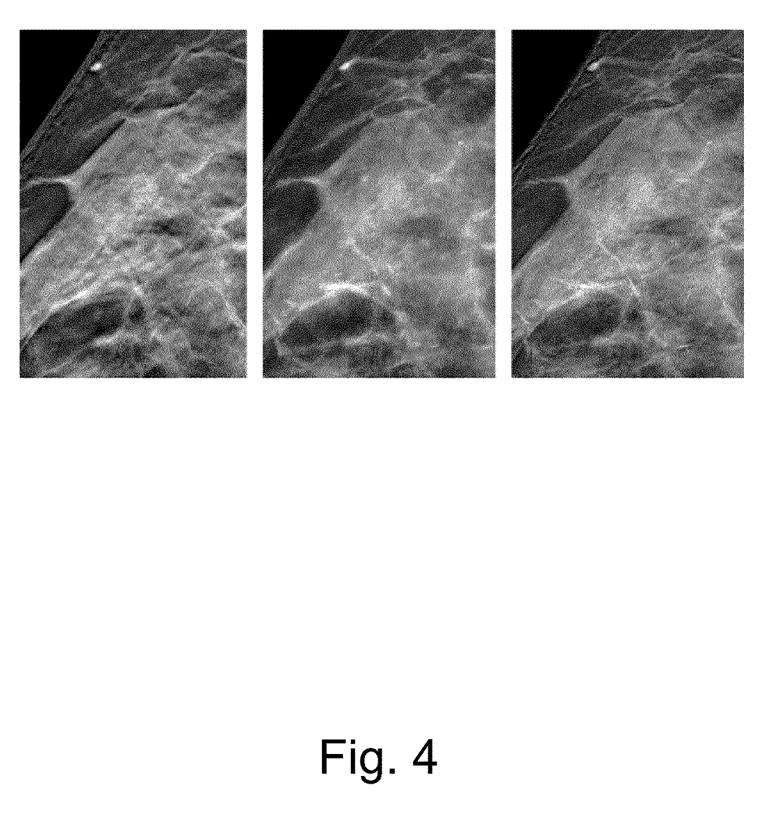
FIG. 4 shows exemplary imagery.

Referring now to FIG. 4, a comparison of the proposed method with the maximum intensity projection (MIP) is shown: a selected slice of the tomosynthesis volume is shown (left). The MIP (center) retains relevant bright features from all slices. However, high-frequency image noise and parenchymal texture are degraded compared to the original slices. The proposed method (right) maintains these sensitive image features while also propagating all relevant features and edges.

The main application of this invention is the generation of synthetic mammograms from a digital breast tomosynthesis acquisition. Beyond this, other imaging modalities which provide 3D volumes may also benefit from the proposed concepts for the computation of high-quality virtual projection views. This includes breast CT, chest CT, chest MR, and many others.

The proposed method, in particular in combination when the Shannon entropy measure is sued has the following important advantages: relevant information is efficiently selected and propagated to the synthetic view, not requiring any feature detection and high-frequency noise (i.e. signal-to-noise ratio (SNR) and noise power spectrum) as well as parenchymal texture of the slices are preserved, such that no separate image filtering and tuning is needed.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing method for forming a projection image, comprising:
    based on a first image, which is obtained from a first set of data acquired by a tomographic imaging system, computing a weight-function computed by computing any or a combination of the following measures: an information theoretic quantity, an edge measure quantity, an intensity measure quantity;
    based on at least a second image, which is obtained from a second set of data acquired by a tomographic imaging system, forward projecting across the second image, along a desired projection direction, to produce a projection image, wherein the first or the second image is a tomosynthesis volume and the projection image is a synthetic image, wherein the forward projection is weighted as per said weight function, and wherein the weight function is re-sampled to match the sampling of the second image by applying an interpolation scheme.

2. The image processing method of claim 1, wherein the first image and the second image are derived from at least two different energy channels of a spectral tomographic imaging system with an energy-resolving photon-counting detector unit, and the predefined projection geometry is chosen similar to a 2D mammographic projection geometry.

3. The image processing method of claim 1, wherein the computing of the weight function comprises local filtering or smoothing.

4. The image processing method of claim 1, wherein the first image is any one of: a spectral image reconstructed from data detected by a photon-counting detector, a reconstructed spatial frequency component image derived from a multi-scale decomposition.

5. The image processing method of claim 1, wherein the second image is a reconstructed energy weighted image volume.

6. The image processing method of claim 1, wherein the weight function is one from a plurality of resolution level specific weight functions, each computed for different resolution levels of the first image.

7. The image processing method of claim 6, wherein the second image is derived from a multi-scale decomposition, wherein a resolution level of the second image corresponds to a resolution level of the resolution specific weight function.

8. The image processing method of claim 1, wherein the weight function is computed by using a sequence of kernels with different sizes.

9. The image processing method of claim 6, wherein the measure, on which the computation of the different weight functions is based, varies with the resolution level.

10. The image processing method of claim 1, wherein the projection image is a synthetic mammogram.

11. The image processing method of claim 1, wherein the images are dynamic 4D volumes and wherein the projection image corresponds to a dynamic 2D projection view.

12. An image processing apparatus comprising a data processor equipped to perform the method of claim 1.

13. A mammography imaging system including the apparatus of claim 12.

14. A non-transitory computer readable medium having stored thereon a program element for controlling an apparatus, which program element, when executed by a processing unit, is adapted to perform elements comprising:
based on a first image, which is obtained from a first set of data acquired by a tomographic imaging system, computing a weight-function computed by computing any or a combination of the following measures: an information theoretic quantity, an edge measure quantity, an intensity measure quantity;
based on at least a second image, which is obtained from a second set of data acquired by a tomographic imaging system, forward projecting across the second image, along a desired projection direction, to produce a projection image, wherein the first or the second image is a tomosynthesis volume and the projection image is a synthetic image, wherein the forward projection is weighted as per said weight function, and wherein the weight function is re-sampled to match the sampling of the second image by applying an interpolation scheme.

* * * * *